United States Patent [19]

Phillips et al.

[11] 4,043,550

[45] Aug. 23, 1977

[54] IMPROVED REGISTRATION MEANS FOR AUTOMATIC DOCUMENT HANDLING APPARATUS

[75] Inventors: Kenneth G. Phillips, Bream, near Lydney; Richard P. Walford, Lydbrook; Clifford Knight, Mitcheldean, all of England

[73] Assignee: Xerox Corporation, Stamford, Conn.

[21] Appl. No.: 687,059

[22] Filed: May 17, 1976

[30] Foreign Application Priority Data

Oct. 24, 1975 United Kingdom .............. 43931/75

[51] Int. Cl.² .............................................. B65H 9/04
[52] U.S. Cl. ...................................... 271/233; 271/4; 271/DIG. 9; 355/75

[58] Field of Search .................... 271/233, 4, 3, 6, 7, 271/10, DIG. 9, 275, 245, 246; 355/75, 76

[56] References Cited

U.S. PATENT DOCUMENTS

| | | | |
|---|---|---|---|
| 3,510,125 | 5/1970 | Krueger et al. .............. | 271/233 X |
| 3,874,651 | 4/1975 | Sisson ........................... | 271/233 X |
| 3,877,696 | 4/1975 | Miciukiewicz ................ | 271/233 X |

*Primary Examiner*—Bruce H. Stoner, Jr.

[57] ABSTRACT

An automatic document handler adapted to register a document against a registration edge on the exposure platen of a reproduction machine, a pivotable baffle being provided to prevent documents from overriding the registration edge during the registration process.

11 Claims, 6 Drawing Figures

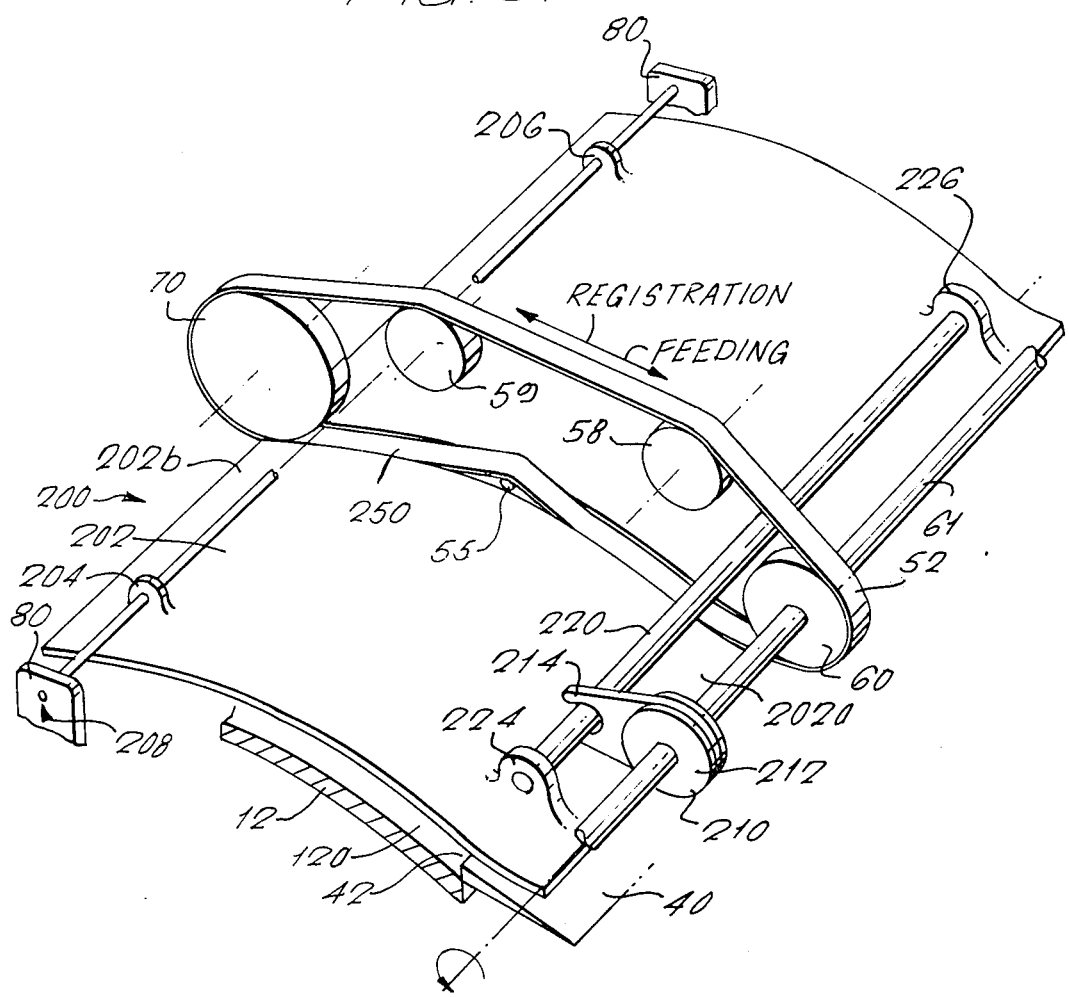

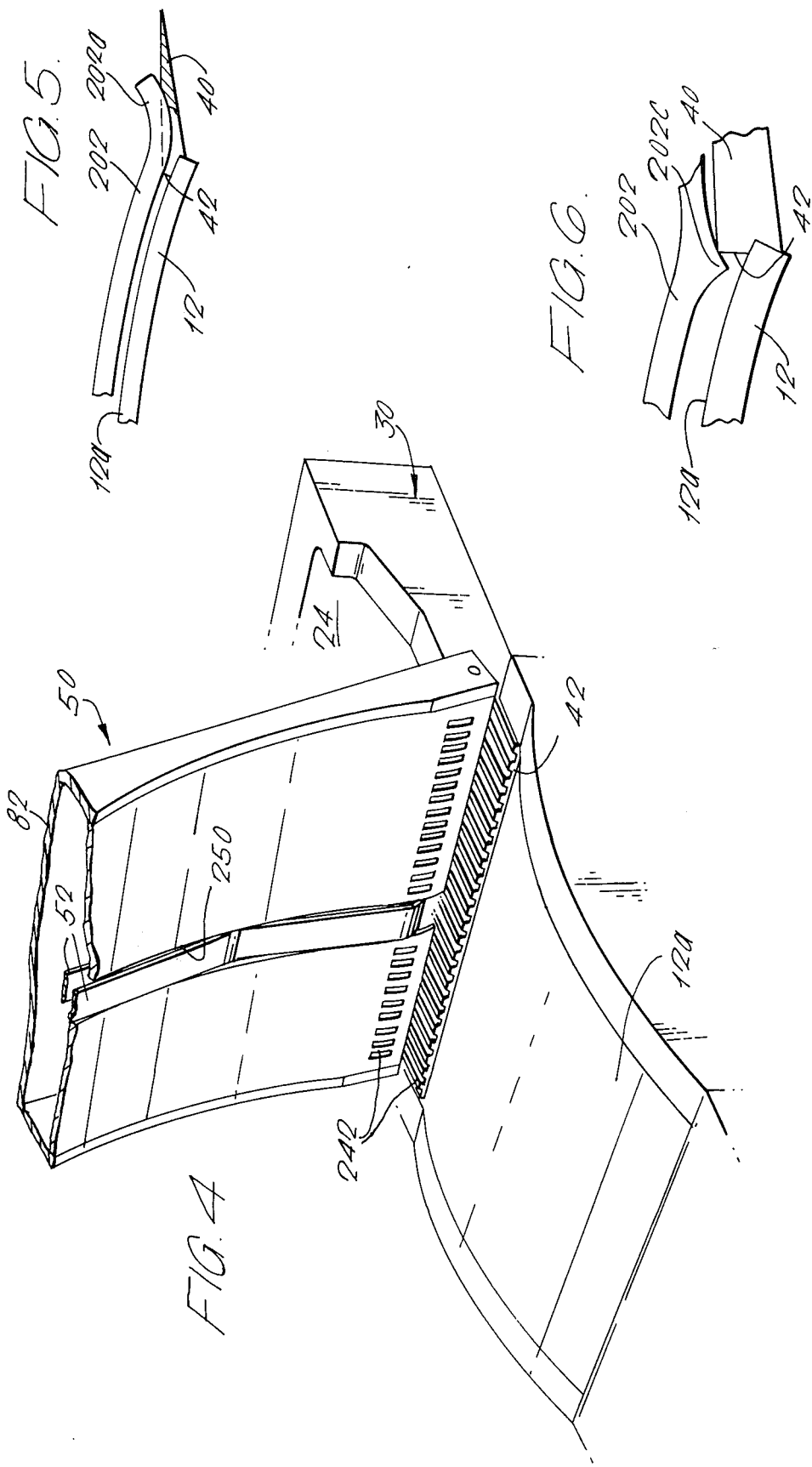

IMPROVED REGISTRATION MEANS FOR AUTOMATIC DOCUMENT HANDLING APPARATUS

BACKGROUND OF THE INVENTION

This invention relates to a document handling apparatus and specifically concerns a means for automatically moving sheets of material sequentially into a predetermined position on a work surface and then moving that sheet of material out of that position to make room for the next sheet.

As will be understood by referring to the commonly assigned U.S. Patent application Ser. No. 687,062 filed on even date herewith and which is incorporated herein by reference, quick and accurate movement of documents to a registered predetermined location and removal of these documents is important in the processing of sheet material in environments such as copying machines. In a copying machine, an automatic document handler must not only rapidly move the document onto a platen, but must accurately register that document in a specific predetermined copying position or area to assure the production of a complete and visually acceptable copy. If the document is situated on the platen in a skewed or misaligned position, the copy will reflect this same skew or misalignment and may be incomplete and/or unacceptable to the user. If the original is wrinkled, torn or creased it may not produce good copies and will not be acceptable to the user for a great number of reasons, not the least of which may be unsuitability for subsequent use in a machine or automated processor. Moreover, the automated handler must be able to perform these functions efficiently with a maximum range of paper or material weights, as documents copied may vary from light weight paper such as what is known as "onion skin" in the order of 50 grams per square meter to much heavier weights in the order of 120 grams per square meter.

SUMMARY OF THE INVENTION

A document handling apparatus including document feed means for feeding documents one at a time past a registration means into a processing area, document transport means positioned over the processing area and adapted to contact a portion of each of the documents for controlling its movement, the transport means being adapted to move the document in a first direction into the processing area, to reverse the document to move it in a second direction to register the document in cooperation with the registration means and, after processing, to move the document again in the first direction to remove it from the processing area. Baffle means are provided overlying the processing area adjacent the registration means, the baffle means being arranged such that the baffle is moved out of engagement with the registration means during document movement in the first direction into the processing area, and is moved into engagement with the registration means during movement of the document in the second direction to prevent movement of the document past the registration means during registration of the document.

According to one feature of the invention, the registration means and the baffle interleave so that when they are in operative contact with each other, the document is prevented from passing the registration means.

BRIEF DESCRIPTION OF THE DRAWINGS

In order that the invention may be more fully understood, a preferred embodiment thereof is described with reference to the accompanying drawings in which:

FIG. 3 is a schematic perspective view of a baffle means in place over a curved exposure station;

FIG. 4 is a schematic perspective view of another embodiment of the invention showing mating raised portions on the registration means and an overlying edge of the baffle means;

FIG. 5 is an enlarged cross-sectional view of the mating sections of FIG. 4; and, FIG. 6 is an enlarged view of an embodiment of a baffle guide configuration adjacent the registration edge.

DESCRIPTION OF THE PREFERRED EMBODIMENT

Figure 1:
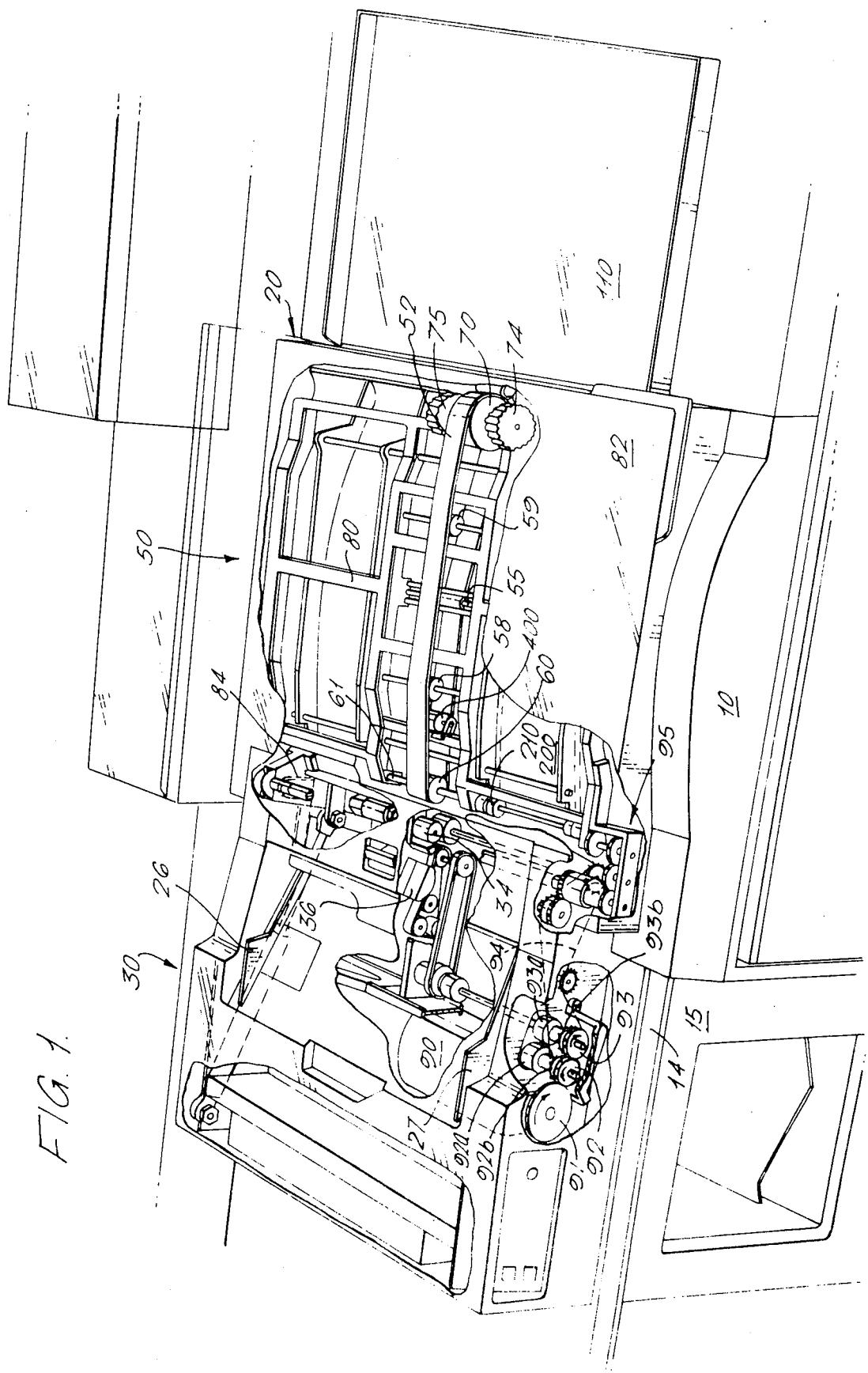
FIG. 1 is a perspective view of a document handling apparatus in place on a copying machine.
Figure 2:
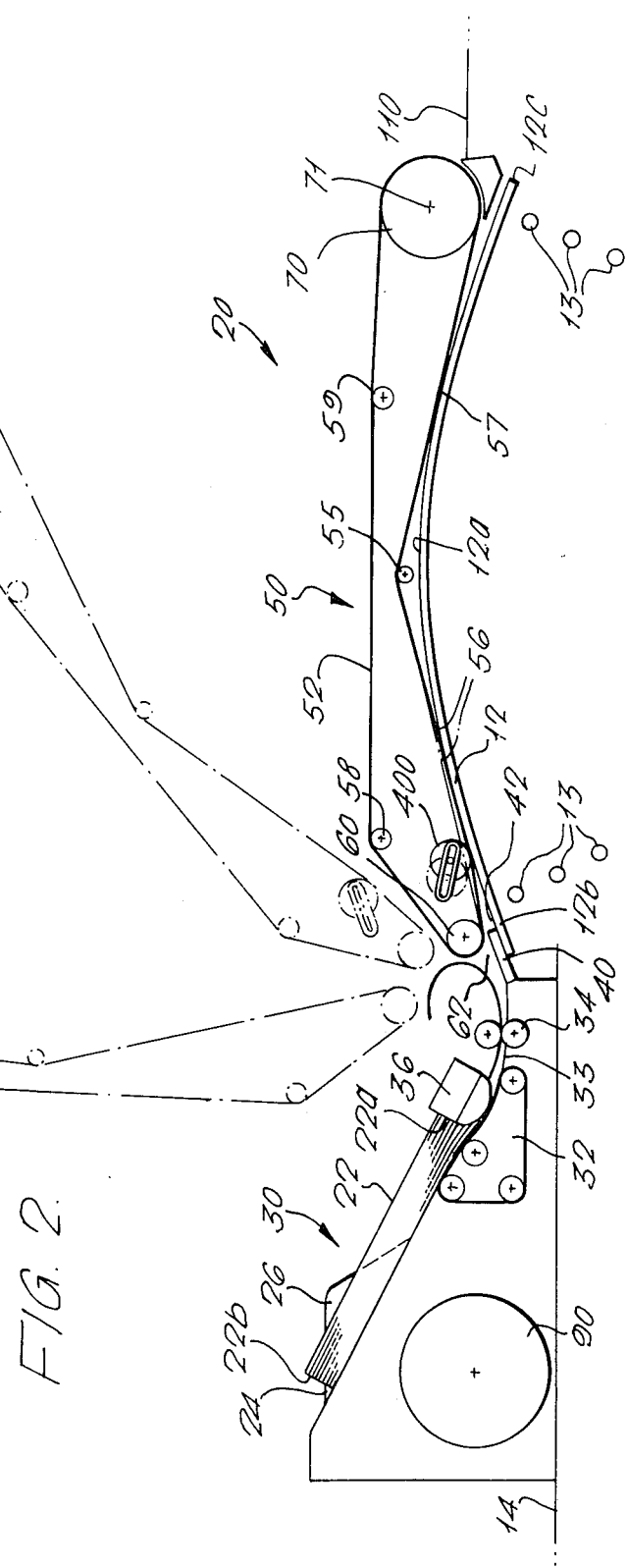
FIG. 2 is a schematic cross-sectional view of a portion of the apparatus of FIG. 1.

Referring to FIGS. 1 and 2 of the drawings there is shown a portion of an automatic electrostatic reproduction machine 10 of the type disclosed in U.S. Pat. No. 3,301,126, having a document handling apparatus of the invention generally indicated at 20 overlying a work station comprising an exposure are of platen 12 of the machine 10 and extending over an upper surface 14 of a sorter extension 15 of the machine. The document handler 20 is synchronized with the control of the machine 10 to automatically feed documents, (which documents may also be referred to as "originals" to distinguish them from their copies) to the platen 12, register them, hold them in position until the selected number of copies have been produced by the machine 10 as required and then remove them from the platen while feeding the next document to be copied. One method of producing the copies by the machine 10 will be understood for example by reference to the above mentioned U.S. Pat. No. 3,301,126 from which it will be seen that the platen 12 is illuminated from below by the lamps 13 in FIG. 2 and the image on an upper surface 12a of the platen reflected onto a photoreceptor surface (not shown here) where the image is developed and from which it is transferred to a suitable substrate to produce the copy.

Document handling apparatus 20 generally comprises a sheet material feeder means 30 and a document transport means 50. The feeder means 30 includes a document supply tray 24, a separator means 32 and a pair of advancing or pinch rolls 34 which are adapted to feed any relatively bendable sheet-like material such as paper, film, etc., one sheet at a time from a quantity of documents, which may be of random size and thickness, to a predetermined position where the document transport means 50 may take control.

For specific details of an embodiment of a sheet separator means 32 which has been found to perform particularly well in this environment reference may be made to copending U.S. Pat. application Ser. No. 687,060 filed on even date herewith.

In operation, documents 22 which may be of the ordinary business type having generally straight and parallel forward and rear edges 22a, 22b respectively, are placed face down for copying in the inclined tray 24 so that the forward edge 22a of the document will be held normal to the direction of document travel by a suitable restraining means 36.

The alignment of the document feed means 32 relative to the processing station 12, which may be an exposure station, is preferably such that the center line of the documents remains at generally the same position regardless of the width of the document. This alignment is provided by a pair of self-centering side guides 26 and 27 on opposite sides of the supply tray 24 which restrain the side edges of the documents generally parallel to the direction of feeding movement and tend to assure the feeding of documents from a central area of the stack or pile regardless of the width of the stack.

With the document thus in place and the processor 10 set to make the required number of copies of each document 22, automatic operation is initiated by activation of a suitable "start print" control.

From its position on the bottom of the document pile in tray 24, the first document is separated from the remainder of the stack by the separating means 32 and fed forward over a guide 33 so that its forward edge 22a enters into the nip of the driven pinch rolls 34, which rolls pull the document 22 completely from the tray and move its forward edge 22a over a registration edge means 40 and under the control of the transport means 50.

The document transport means 50 preferably comprises an endless belt means 52 riding over and extending between a first roller means 60 and a second roller means 70, whereby the belt means 52 is movable in alternate first and second directions. The roller means 60 and 70 rotate on shafts 61 and 71 respectively which are mounted on a movable frame means 80 located centrally along opposite sides 12b and 12c of the platen upper surface 12a so that the belt entrained thereover extends across the central portion of the platen or processing station 12, as may be best seen in FIG. 3. The frame 80 supports a suitable outer cover 82 which hides the moving parts and prevent light from entering the platen 12.

Preferably the first roller means 60 is of small diameter (e.g., 1.5 inches) so that a nip 62 between the belt means 52 entrained thereover and the platen surface 12a may be as close as necessary to the edge 12b of the platen and to the paper feed means 30. The belt means 52 rests on the platen surface 12a and is made of a material such as silicone rubber on a flexible backing and is preferably white on its outer surface and has a high coefficient of friction with paper type materials, e.g., 1.0 – 1.5$\mu$. The platen surface 12a will usually be smooth glass so that its coefficient of friction with the paper or belt is relatively low, e.g., less than 1.0$\mu$. Consequently, a document in the form of a material with a high coefficient of friction such as paper for example, will be effectively gripped by the belt 52 on its upper side when it is fed into the nip 62 and caused to slide over the surface 12a on its lower side under the control of the belt means 52.

A registration member 40, functioning to align documents in a predetermined relationship, extends along platen edge 12b and is arranged so that documents being fed toward the platen 12 in a first direction pass smoothly thereover; however, it includes an edge 42 raised above the surface 12a so that once a document passes thereover and is moved in a second, reverse, direction, the trailing edge 22b of the document held against the surface 12a will abut thereagainst. As shown broadly in FIG. 3, a baffle means 200 may be provided, to assure proper abutment of the document edge against the registration surface 42 by preventing the document edge riding back over the registration surface 42.

Details of an embodiment of the baffle means 200 may be seen in FIG. 3 to include a member generally indicated at 202 overlying the processing station 12 and extending on opposite sides of the belt means 52. The member 202 has a first edge portion 202a overlying the registration member 40 and a second, opposite edge portion 202b, pivotally mounted to the frame 80 by means of hinge portions 204 and 206 which are rotatably mounted on an axis means 208 that is secured to the frame 80. The portion 202a of member 202 is movable into and out of operative engagement with the registration means 40 by a lift mechanism generally indicated at 210 that is connected with a drive axis 61 for said transport roller means 60. Said baffle means is preferably provided with a white surface to provide the proper optical background for the document thereagainst.

A clutch means 212 transmits a portion of the rotary motion of the drive 61 in the direction indicated by the labelled arrow during feeding drive to a lift arm 214 that coacts with a lifting bar 220 (suitably secured to the baffle member 202 by portions 224 and 226) to pivot the baffle member upwardly about axis 208 and raise edge portion 202a above member 40. In this raised position, a sheet of material may pass under the baffle and over the registration member 40 onto the surface 12a. When the drive reverses to move the belt in the registration direction as indicated by the labelled arrow, the clutch pivots arm 214 downwardly to move the baffle tight against the portion 40 thereby causing the trailing edge 22b of document 22 to abut the edge 42 and preventing its movement therepast.

In practice we have found that the clutch 212 is advantageously a friction type clutch such as a friction override clutch which will allow rotation of the drive after the baffle reaches its open or closed position. Suitable means limit the upward movement of the baffle means. While the clutch 212 has been shown as being coaxial with the drive axis 61, it will be understood that other arrangements are contemplated to be within the scope of this invention. According to an embodiment of the invention we have found that configuring the edge portion 202a and the registration member edge 42 with meshing or interleaving portions 242 such as square teeth provides an operative registration edge as soon as the teeth intermesh even though they have not reached the fully closed position shown in FIG. 5. In practice we have found that regularly spaced square grooves in the edge 202a and in the edge 42 provides excellent results. The edge 202a advantageously curves upward slightly as shown in FIG. 5 to facilitate entrance of the sheet material. The angle of the edge 42 with the platen surface 12a preferably is less then 90° to urge the edge against the platen. In addition, the baffle 202 may have a guide ridge portion 202c as shown in FIG. 6 to urge the document edge against the lower portion of the registration edge 42.

In the schematic of FIG. 3, an opening 250 allows the narrow belt means 52 to pass into contact with the platen surface 12a; however, this does not mean that the halves need be separate portions and in fact we have found a single piece baffle member 202 to be preferable. In such cases suitable bridging portions are provided that allow easy movement of belt.

The baffle means is generally uniformly spaced above the platen surface 12a as indicated in FIG. 5 and in practice we have found a spacing of 0.035 to 0.050 inches to provide excellent results by allowing adequate room for a wide thickness range of sheet material to move freely and yet small enough to prevent undesirable buckling and creasing of the thinnest material when it is registered under the worst conditions, e.g., high humidity.

A support means 55 for the belt means 52 is positioned on the outside of the belt means 52 to form a hitch above the platen 12 at an intermediate point between the first and second roller means 60, 70 respectively so that the belt means contacts the processing station surface 12 at two separated contact areas 56, 57 along its length, one being on each opposite side of said intermediate point, as is shown in FIG. 2. Preferably, the intermediate point is generally halfway between the first and second roller means. In practice we have found that contact areas of two to three inches in length provide sufficient control of the document. The belt support means 55 preferably is a highly durable material having a coefficient of friction such as Delrin (Trademark) for example. It may be of fixed configuration as shown or may take other equivalent forms.

Other idler rollers such as shown in 58, 59 may be provided as required at other positions along the length of the belt means 52. These may be positioned to adjust belt tension.

The separated contact areas have the advantage that the area of frictional engagement between the belt means and the document may be set to assure a good grip of the document by the belt as it is being moved onto the platen 12, but yet allow pivoting of the document in a generally central area as shown in FIG. 4 so that any skew may be corrected when the document is moved by the belt against the registration member 40. With a full width belt, frictional contact between the document and the belt tends to be so great that no amount of skew of the document can be corrected on registration and the document will buckle.

A further advantage of the multiple contact areas is that the functions of document positioning and ejecting are separated. Generally, for the most part the former is controlled by the area 56 and ejection from the platen is controlled by the area 57. The magnitude of the forces on the document may be controlled by varying the coefficient of friction of belt support means 55. Thus, the higher the coefficient of friction of means 55, the greater the tension difference on either side of the support means.

An additional benefit of the intermediate support 55 is to limit the amount of sag in the belt means 52 when the transport means 50 is lifted from its operative position on the platen to an inoperative position above the platen as shown for example by the dotted lines in FIG. 2, and in FIG. 4.

By using a narrow belt means 52 with a crowned roller means 60, 70, construction is greatly simplified in that no side guides are required and tracking problems are greatly reduced from what they are known to be with a wide belt. Thus, we have found that a wide belt, or one with a length to width ratio of less than about 35 - 1 does not track accurately without guides and/or very expensive precise alignment of the pulley axes and therefore may have a tendency for sideways movements which could cause skewing of the document.

We have found that a narrow belt by contrast, i.e., one of greater than a 35 - 1 length to width ratio, tracks very well without any guides and does not cause the document to skew.

Operating the belt means 52 in a stable condition on crowned pulleys or rollers 60, 70 without edge guides eliminates the belt edge wear and possible detracking which may occur under unstable conditions. Accordingly, maintenance is minimized. The drive roller means 60, may advantageously be rubber tired to improve traction.

Power to drive the paper feeder means 30 and the belt transport means 50 is supplied by a motor 90 which may be advantageously located under the document tray 24. Rotary motion is transmitted from the motor drive gear 91 to a pair of counter rotating gears 92, 93 which in turn are each connected via clutch means 92a, 93a to chain drive sprockets 92b, 93b respectively whereby alternate engagement of the clutches will transmit counter clockwise rotation respectively to a chain drive means 94. A clutch surface between the gears 92, 93 and sprockets 92, 93b is engaged or disengaged by a clutching means which is electrically energized in response to machine control logic. The chain drive means 94 in turn causes the pinch rolls to drive intermittently and a series of interconnected gears generally indicated at 95 to alternately drive axis 61 and the first roller means 60 in opposite first and second directions and turn the platen baffle lift means 210 as required.

In operation, as the sheet feeder 30 begins to separate and feed document 22, the platen baffle means 200 is raised by the lift means 210 to open a document entrance gap below it and above the registration member 40 so that documents advanced by the pinch rolls 34 will enter the gap. When the pinch rolls 34 pass the forward or leading edge 22a of a document toward the nip 62 of the document transport means 50, a sensing switch located between them is tripped which causes a trailing edge 22b of the document to be detected. After a small delay, the baffle 200 is caused to close against member 40 and the belt means 52 is caused to reverse to the second direction. The reverse movement of the belt means is timed to allow the trailing edge to abut the registration surface 42 and cause the belt means 52 to slip over it briefly to assure full registration and correction of any skew.

Closure of baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled, giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off, the copy will not, in most cases of 1:1 copying onto document sized paper, include all of the original document. Even where document margins are such that essential information would not be lost as a result of misregistration, nevertheless the aesthetics and integrity of copy would be severly reduced in the eyes of a reader. In most cases, it just would not look acceptable and hence the information it conveys may suffer as a result. Accordingly, this is not acceptable.

After the document has been registered, the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

Although the invention has been described in terms of a single narrow centrally located belt means 52 it is within the scope of this invention that the centrally located belt means may comprise two or more parallel narrow belts.

While the preferred embodiment described has included a curved platen it will be understood that the invention herein is not so limited but applies as well to flat platen and other processing station configurations. Moreover, it will be understood that the terms "platen" and "exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

While we have described and illustrated herein a preferred form of the invention, it will be apparent to those skilled in the art that changes and modifications may be made thereto without departing from the spirit and intent of the invention which is limited only to the scope of the appended claims.

What is claimed is:

1. A document handling apparatus including document feed means for feeding documents one at a time past a registration means into a processing area, document transport means positioned over said processing area and adapted to contact a portion of each of said documents for controlling its movement, said transport means being adapted to move said document in a first direction into said processing area, to reverse said document to move it in a second direction to register said document in cooperation with said registration means and, after processing, to move the document again in said first direction to remove it from said processing area;

baffle means overlying said processing area adjacent said registration means; and, lift means for moving said baffle means into and out of engagement with said registration means, said baffle means being arranged such that in use of the apparatus, it is moved out of engagement with said registration means during movement of a document in said first direction into said processing area, and is moved into engagement with the registration means during movement of a document in said second direction to prevent movement of said document past said registration means during registration of said document.

2. A document handling apparatus according to claim 1 wherein said baffle means is pivotally mounted adjacent said processing area.

3. A document handling apparatus according to claim 2 further including a lift mechanism for moving said baffle means into and out of engagement with said registration means, drive means for driving said document transport; and, clutch means connecting said lift mechanism to said drive means for moving said lift mechanism.

4. A document handling apparatus according to claim 3 wherein said document transport means comprises an endless belt extending across said processing area, said endless belt being entrained over first and second roller means, the first roller means being driven by a drive shaft, said clutch means being coaxial with said drive shaft.

5. A document handling apparatus according to claim 4 wherein said clutch means is a friction override clutch.

6. A document handling apparatus according to claim 1 wherein said registration means has upstanding portions spaced from each other, and said baffle means has a mating surface comprising grooves which mesh with said upstanding portions.

7. A document handling apparatus according to claim 6 wherein said registration means includes a registration edge, said registration edge being formed by an edge of said mating portions.

8. A document handling apparatus according to claim 7 wherein said baffle means has a white surface to provide an optical background.

9. A document handling apparatus according to claim 8 wherein said baffle means is positioned above said belt means and is formed of a single member.

10. A document handling apparatus according to claim 1 wherein said registration means is a generally planar surface inclined to said surface of said processing area at an angle of less than ninety degrees.

11. A document handling apparatus according to claim 1 wherein said baffle means includes a ridge adjacent said registration means for guiding a document edge against a lower portion of said registration means.

* * * * *